United States Patent [19]

LoBello

[11] Patent Number: 5,276,426
[45] Date of Patent: Jan. 4, 1994

[54] OVERHEAD OBSTRUCTION SENSING DEVICE

[76] Inventor: Peter J. LoBello, 130 Beechwood Dr., Mamaroneck, N.Y. 10543

[21] Appl. No.: 958,746

[22] Filed: Oct. 9, 1992

[51] Int. Cl.⁵ .............................................. B60Q 1/00
[52] U.S. Cl. .......................... 340/436; 340/825.69; 340/825.72; 200/61.42; 200/61.44; 116/28 A; 116/203
[58] Field of Search ............ 340/435, 436, 825.72, 340/437, 825.69, 901; 200/61.41, 61.42, 61.43, 61.44; 116/28A, 203

[56] References Cited

U.S. PATENT DOCUMENTS

| | | | |
|---|---|---|---|
| 2,554,371 | 5/1951 | Marx | 200/52 |
| 2,834,002 | 5/1958 | Nordsiek | 340/61 |
| 3,269,783 | 8/1966 | Kriz | 303/18 |
| 3,439,326 | 4/1969 | Boudin | 340/472 |
| 3,720,916 | 3/1973 | Edgar | 340/436 |
| 3,769,931 | 11/1973 | Babut et al. | 116/28 |
| 4,156,865 | 5/1979 | Lovell et al. | 340/436 |
| 4,284,971 | 8/1981 | Lowry et al. | 340/904 |
| 4,307,375 | 12/1981 | Marshall, Sr. | 340/61 |
| 4,550,605 | 11/1985 | Bains | 324/220 |
| 4,916,429 | 4/1990 | Hicks et al. | 340/436 |
| 5,012,222 | 4/1991 | Gavrilis | 340/436 |
| 5,132,662 | 7/1992 | Burch | 340/436 |
| 5,156,489 | 10/1992 | Replogle | 73/215 |

OTHER PUBLICATIONS

Radio Shack 1986 Catalog p. 67 "AM/FM Power Antenna (Retracts Under Fender)".

*Primary Examiner*—John K. Peng
*Assistant Examiner*—Nina Tong
*Attorney, Agent, or Firm*—Fitzpatrick, Cella, Harper & Scinto

[57] ABSTRACT

An overhead sensing device for motor vehicles and the like comprises a non-conductive flexible feeler adapted for contacting an overhead obstruction, and an actuation device for outputting a signal in response to the non-conductive flexible feeler contacting an overhead obstruction. An audible and a visual signal device signals the operator in the case where the non-conductive flexible feeler contacts an overhead obstruction. The audible and visual signaling device are operative in response to the output of the actuation device. A control device, including a remote control device, controls the height of the non-conductive flexible feeler above a highest point of the motor vehicle.

25 Claims, 3 Drawing Sheets

OVERHEAD OBSTRUCTION SENSING DEVICE

BACKGROUND

1. Field Of The Invention

The present invention relates to an overhead obstruction sensing device for motor vehicles and the like which provides an audible and/or visual alarm in the case of contact with an overhead obstruction.

2. Description Of The Related Art

Motor vehicles and, in particular, semitrailer trucks are constantly troubled with insufficient overhead clearance when passing under overhead obstructions such as bridges, loading docks, tree branches, and overhead wires In view of the danger and monetary damages associated with motor vehicles coming into contact with overhead obstructions, sensing devices have been developed for warning of potential contact with an overhead obstruction.

For example, U.S. Pat. No. 4,307,375 describes a sensing device which includes a vertically adjustable metal shaft mounted on a motor vehicle forward of the highest point on the motor vehicle. The metal shaft is connected to a microswitch device which is actuated upon deflection of the metal shaft by contact with an overhead obstruction. The height of the metal shaft is adjusted to match the height of the motor vehicle. The micro-switch device, if actuated, allows current to flow to an alarm thereby warning the operator that the overhead clearance is insufficient.

Conventional sensing devices, however, are difficult to adjust vertically, and it has heretofore been difficult to match the height of the motor vehicle to the height of the metal shaft. In addition, because such sensing devices operate by contacting overhead obstructions, there is danger if the overhead obstruction is a high-tension power line or the like.

SUMMARY OF THE INVENTION

Accordingly, the present invention has been made in consideration of the above-described deficiencies of prior sensing devices In one aspect, the present invention provides an overhead obstruction sensing device which has a flexible non-conductive feeler which is adapted to sense overhead obstructions. The feeler, which is generally rod-shaped, may be mounted on a lower support section which may be conductive and thereby serve other purposes such as a radio antenna.

According to this aspect of the invention, an overhead sensing device for motor vehicles comprises a non-conductive flexible sensing means adapted for contacting an overhead obstruction, actuation means for outputting a signal in response to the non-conductive flexible sensing means contacting an obstruction, height adjustment means for adjusting the height position of the nonconductive flexible sensing means, and indication means for indicating a non-alarm state and an alarm state, wherein the indicating means indicates an alarm state in the case the indicating means receives the output signal from the actuation means in response to contacting an obstruction.

In another aspect, the present invention provides a height-adjustable obstruction sensing device whose height may be adjusted remotely so as to facilitate matching the height of the sensing device to the highest point of the vehicle on which the device is mounted.

According to this aspect of the invention, an overhead obstruction sensing device for motor vehicles and the like comprises a flexible feeler for contacting an overhead obstruction, and actuation means for outputting a signal in response to the flexible non-conductive feeler contacting the overhead obstruction. An indicating means indicates visibly and/or audibly in the case the flexible feeler makes contact with the overhead obstruction, wherein the indication means outputs an audible and/or visible alarm in response to the output signal from the actuation means. A height adjustment means adjusts a height position of the flexible feeler and a remote control means remotely controls the height of the flexible feeler.

According to yet another aspect of the present invention, an overhead sensing device for motor vehicles and the like comprises a non-conductive flexible feeler for contacting an overhead obstruction, and an actuation means for outputting a signal in response to the non-conductive flexible feeler contacting an overhead obstruction. An audible and a visual warning device warns an operator of the motor vehicle in the case the non-conductive flexible feeler contacts an overhead obstruction, wherein the audible and visual warning device are operative in accordance with the output from the actuation means. A control means controls the height of the non-conductive flexible feeler above the highest point of the motor vehicle, and remote control means for remotely controlling the height of said flexible feeler.

According to yet another aspect of the present invention, a method for setting the height of an overhead obstruction sensing device for a motor vehicle comprises the steps of adjusting a ruler so as to correspond to the height of the motor vehicle, placing the ruler adjacent the overhead obstruction sensing device, and remotely controlling the height of the overhead obstruction sensing device from outside the motor vehicle in accordance with the adjustable ruler.

Objectives and advantages in addition to those discussed above shall be apparent to those skilled in the art from the description of the preferred embodiment of the invention which follows. In the description, reference is made to the accompanying drawings, which form a part hereof, and which illustrate an example of the invention. Such example, however, is not exhaustive of the various embodiments of the invention, and therefore reference is made to the appended claims for determining the scope of the invention.

DETAILED DESCRIPTION OF THE PREFERRED EMBODIMENT

Figure 1:
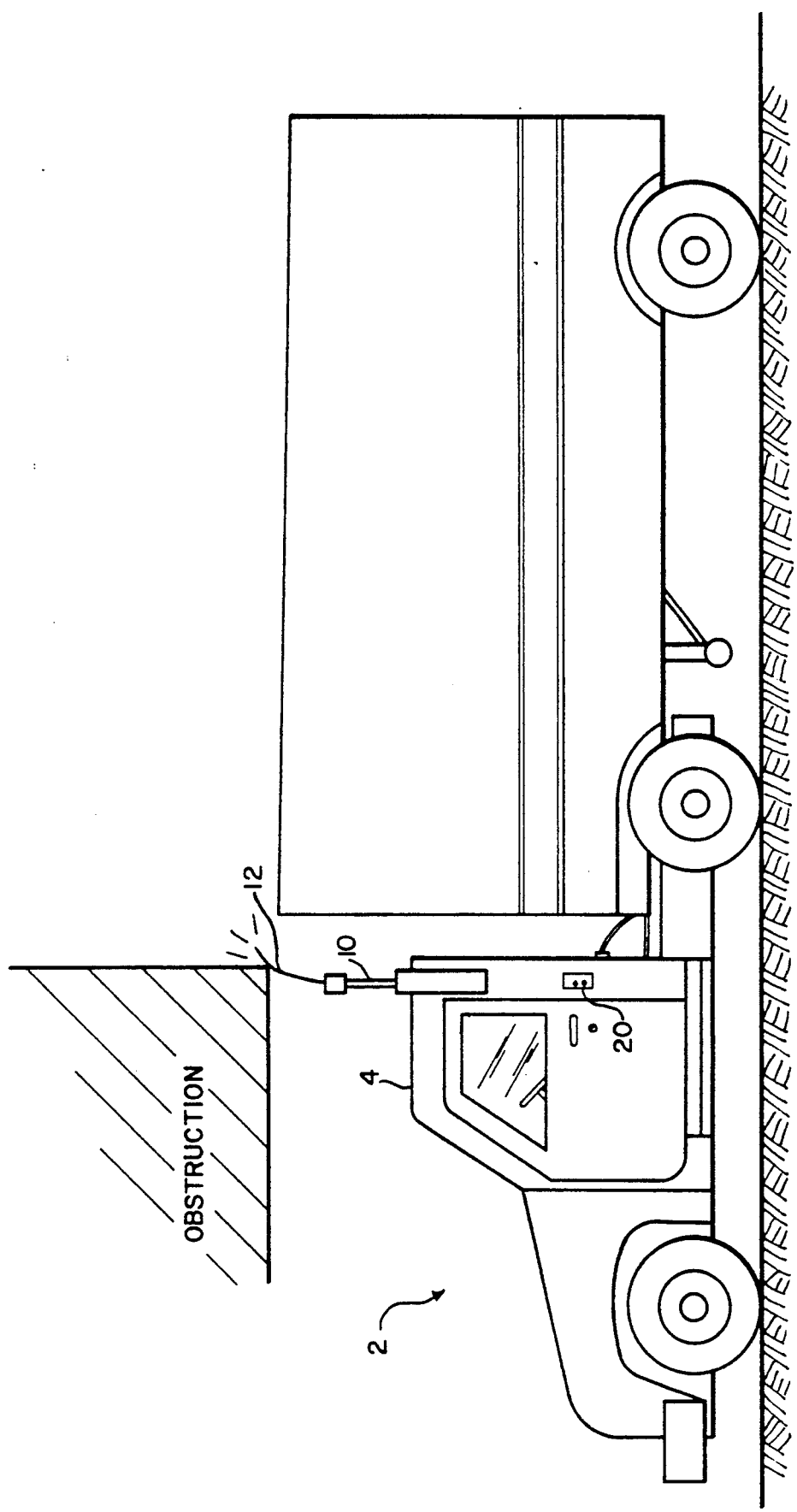
FIG. 1 is a side perspective view of a semi-trailer truck having the sensing device mounted thereon.

FIG. 1 shows semi-trailer truck 2 having a cab 4. On the exterior rear portion of cab 4, obstruction sensing device 10 is mounted. Sensing device 10 is preferably mounted forward of the highest point on the vehicle so as to provide advance warning of obstructions to the driver when the vehicle is moving forward. An additional sensing device (not shown) may be provided rearward of the highest point on the vehicle so as to provide advance warning of obstructions to the driver when the vehicle is moving in reverse.

While sensing device 10 is shown mounted on the rearward portion of cab 4, it may also be positioned at the forward position of the cab as well. Sensing device 10 is mounted on the cab such that rod 12 can be elevated to a position which is higher than the highest point of semi-trailer truck 2 and such that flexible rod 12 will come into contact with an overhead obstruction before making contact with the highest point of semi-trailer truck 2.

Sensing device 10 includes a flexible rod 12 which is adaptable to deflect upon contacting an overhead obstruction 6. Flexible rod 12 is preferably made from a non-conducting material such as fiberglass or the like. In this fashion, if rod 12 comes into contact with a high power line, the current from the high power line will not flow through rod 12 into the vehicle.

Figure 2:
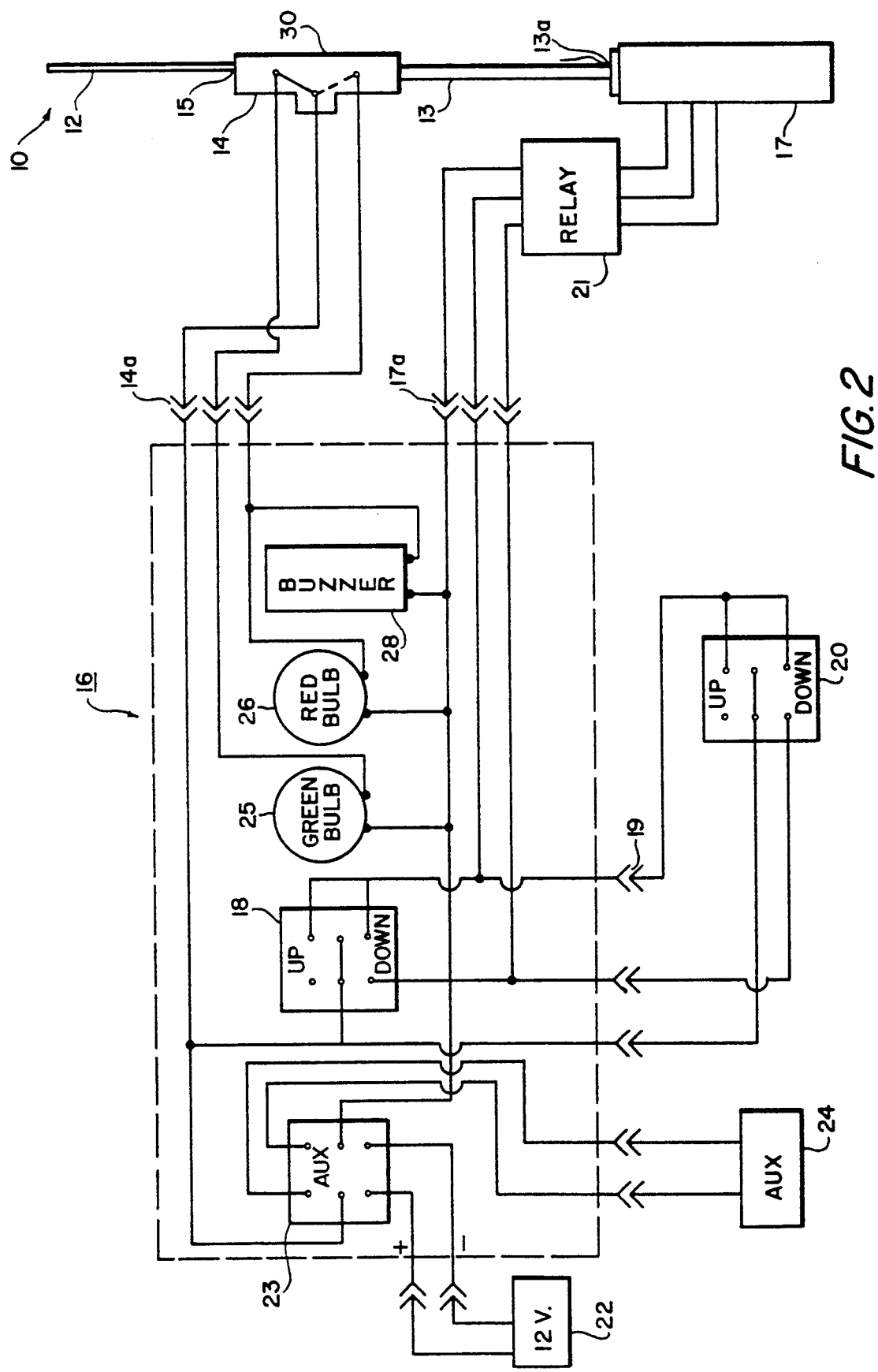
FIG. 2 is a diagrammatic view of the sensing device of the present invention which illustrates the wiring connections between components.

As shown in FIG. 2, flexible rod 12 is secured at its distal portion 15 to micro-switch 14. Within micro-switch 14 there is switching arm 30. In response to a deflection of rod 12, micro-switch 14 is actuated by the deflection motion. Upon deflection of rod 12, micro-switch 14 is actuated such that switching arm 30 is toggled from a first position which supplies current to a non-alarm actuator, to a second position which supplies current to an alarm.

The contacts in micro-switch 14 are connected to primary control circuit 16 via detachable connectors 14a. The details of primary control circuit 16 are described hereinbelow.

FIG. 2 illustrates a wiring schematic of the present invention. Sensing device 10 utilizes the semi-trailer truck motor battery 22 as a primary power source. However, an auxiliary power source 24, such as a battery, may be employed for the same purpose. Switch 23 selects between power from battery 22 or auxiliary power source 24. Whichever power source is selected, it supplies current to micro-switch 14, control unit 16, and various audible and visual alarms, such as green bulb 25, red bulb 26, and buzzer 28.

During a non-alarm state, switching arm 30 within micro-switch 14 contacts a lead which allows current to flow from the selected power source to a visual non-alarm indicator, such as green bulb 25. In the case where the obstruction sensing device comes into contact with an overhead obstruction, flexible rod 12 is deflected thereby pivoting around distal portion 15 to actuate micro-switch 14 such that switching arm 30 is tripped to allow current to flow to visual alarm 26 and/or audible alarm 28.

Thus, an operator of the motor vehicle or the like can be alerted to imminent contact with an overhead obstruction prior to making contact. Accordingly, an operator can take evasive action thereby avoiding physical and monetary damage to both the vehicle and obstruction.

Flexible rod 12 and micro-switch 14 are attached to telescoping mast 13 which can be adjusted vertically up or down. Telescoping mast 13 is preferably made of conductive materials such as steel and may be structured in a conventional fashion, such as a car radio antenna. Antenna lead 13a may be provided for connection to a radio.

The height of telescoping mast 13, and consequently the height of rod 12, is adjusted by up/down control unit 17. Control unit 17 includes a motor to operate telescoping mast 13. Telescoping mast 13 can be vertically adjusted by up-down buttons of height adjuster switch 18 which is preferably mounted within the cab 4. Up/down control unit 17 is connected to relay switch 21 which permits electrical connection with primary control circuit 16 via detachable connectors 17a.

Remote height adjuster 20 is also provided to operate the motor in up/down control unit 17. In this fashion, an operator can adjust the height of rod 12 from outside cab 4. In operation, an operator can properly adjust the height of rod 12 by visually measuring between the height position of semi-trailer 2 and the height of rod 12 such that the height of rod 12 is at a position which is higher than the highest point of semi-trailer 2.

The contacts in remote height adjuster 20 are connected to primary control circuit 16 via detachable cables 19. Detachable cables 19 extend from primary control circuit 16 with sufficient length so that an operator may adjust the height of rod 12 from outside cab 4. It is also possible to provide remote height adjuster 20 with a radio transmitter so as to eliminate the need for cables 19. In this event, primary control circuit 16 is fitted with a corresponding radio receiver.

Figure 3:
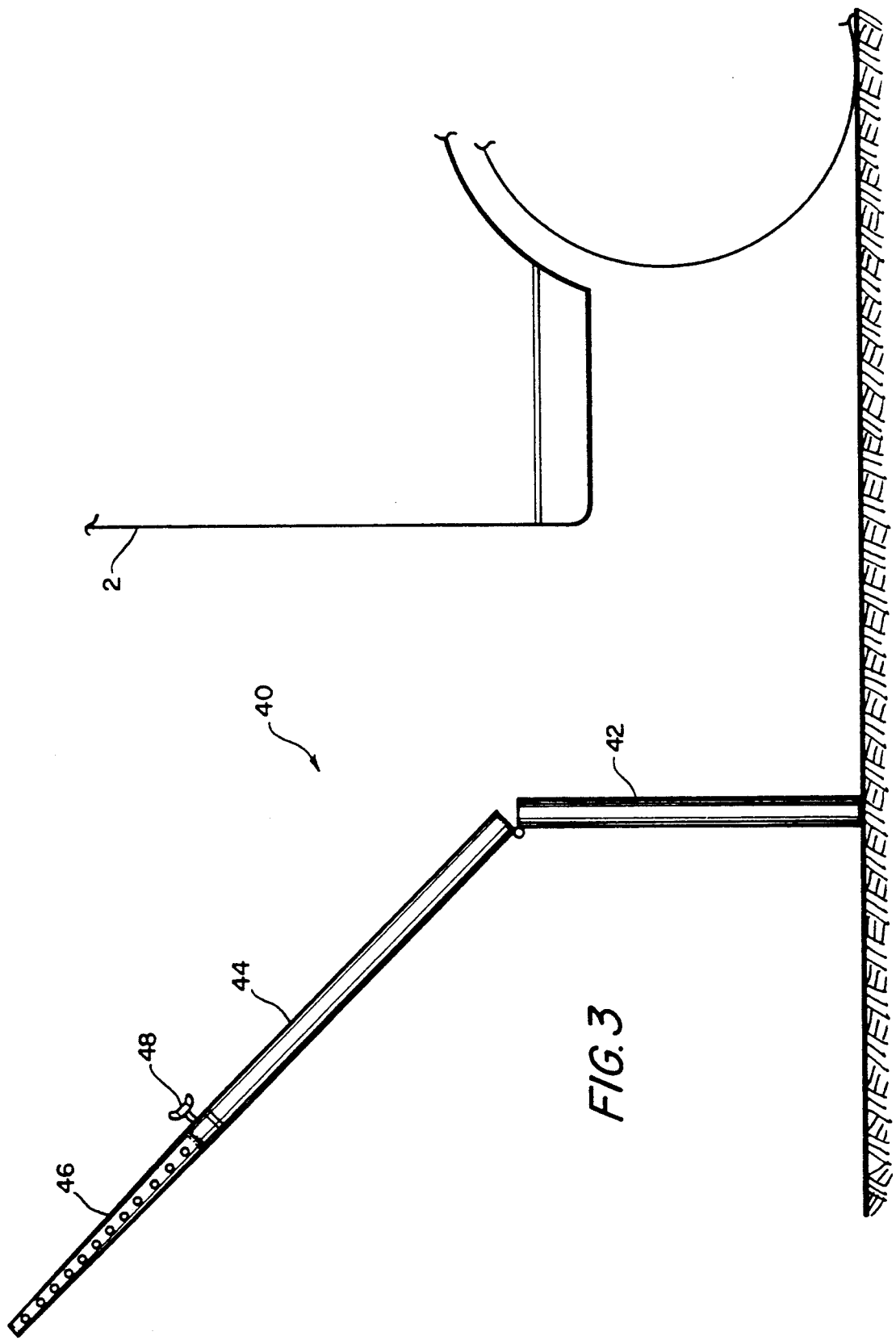
FIG. 3 is a perspective view of a measuring ruler.

Measuring ruler 40, such as shown in FIG. 3, may be provided to facilitate remote height adjusting by remote height adjuster 20. Measuring ruler 40 is used to measure the highest point of semi-trailer 2 and then is placed next to telescoping mast 13 and rod 12 in order to adjust the telescoping mast 13 so that the height of rod 12 is at a position which is equal to or greater than the highest point of semi-trailer 2. Advantageously, the operator may use the remote height adjuster 20 so that these adjustments can be made outside of cab 4.

Measuring ruler 40 is made of three sections which are preferably equal lengths of five feet each. Base section 42 is securely hinged to middle section 44 so that the user can lower upper ruler portion 46 for adjustment without difficulty. Ruler portion 46 is slidably mountable within middle section 44 and has adjustment holes at one inch increments along its length. At the top portion of middle section 44 is disposed wing nut 48 which can be screwed into adjustment holes in ruler portion 46. In this fashion, the user can adjust ruler portion 46 by one inch increments to the highest point of semi-trailer truck 2. Thereafter, the user can place measuring ruler 40 alongside sensing device 10 and remotely adjust the height of rod 12 with remote height adjuster 20 to an equal or greater height than measuring ruler 40.

What is claimed is:

1. An overhead sensing device for motor vehicles, comprising:

a non-conductive sensing means for contacting an overhead obstruction;

actuation means for outputting a signal in response to said non-conductive sensing means contacting an obstruction;

height adjustment means for adjusting the height position of said non-conductive sensing means;

first height control means for controlling the height of the height adjustment means from within the motor vehicle;

second height control means for remotely controlling the height of said height adjustment means from outside the motor vehicle; and indication means for indicating a non-alarm state and an alarm state, wherein said indicating means indicates the alarm state in the case where the indication means receives the output signal from said actuation means in response to an obstruction contact.

2. An overhead sensing device according to claim 1, wherein said non-conductive sensing means is made of an insulating material.

3. An overhead sensing device according to claim 1, wherein said second height control means is detachably connected to extended cables from said height adjustment means.

4. An overhead sensing device according to claim 1, wherein said height adjustment means includes a conductive rod and wherein said non-conductive sensing means is mounted on the conductive rod.

5. The overhead sensing device according to claim 4, wherein said conductive rod is a telescoping mast.

6. The overhead sensing device according to claim 5, wherein said telescoping mast is operable to receive radio frequency transmissions.

7. The overhead sensing device according to claim 1, wherein said indication means is an audible warning device.

8. The overhead sensing device according to claim 7, wherein said indication means further comprises a warning light.

9. An overhead obstruction sensing device for motor vehicles, comprising:
a feeler adapted for contacting an overhead obstruction;
actuation means for outputting a signal in response to said feeler contacting said overhead obstruction;
indication means for indicating visibly and audibly in the case said feeler makes contact with said overhead obstruction, wherein said indicating means outputs an audible and visible alarm in response to the output signal from said actuation means;
height adjustment means for adjusting a height position of said feeler;
control means for controlling the height of said feeler from within the motor vehicle; and
remote control means for remotely controlling the height of said feeler from outside the motor vehicle.

10. An overhead sensing device according to claim 9, wherein said feeler is made of a non-conductive material.

11. An overhead sensing device according to claim 9, wherein said remote control means is detachably connected to extended cables from said height adjustment means.

12. An overhead sensing device according to claim 9, wherein said height adjustment means includes a conductive rod and wherein said feeler is mounted on the conductive rod.

13. The overhead sensing device according to claim 12, wherein said conductive rod is a telescoping mast.

14. The overhead sensing device according to claim 13, wherein said telescoping mast is operable to receive radio frequency transmission from an external source.

15. The overhead sensing device according to claim 9, wherein said indication means is an audible warning device.

16. The overhead sensing device according to claim 15, wherein said indication means further comprises a warning light.

17. An overhead sensing device for motor vehicles, comprising:
a non-conductive flexible feeler for contacting an overhead obstruction;
an actuation means for outputting a signal in response to said non-conductive flexible feeler contacting an overhead obstruction;
an audible and a visual warning device for warning an operator of said motor vehicle in the case said non-conductive flexible feeler contacts an overhead obstruction, wherein said audible and visual warning device are operative in accordance with the output from said actuation means;
height adjustment means for adjusting the height of the non-conductive flexible feeler;
control means for controlling from within the motor vehicle the height adjustment means such that said non-conductive flexible feeler is adjusted to a height above the highest point of said motor vehicle; and
remote control means for remotely controlling from outside the motor vehicle said height adjustment means such that the height of said non-conductive flexible feeler is adjusted to a height above the highest point of the motor vehicle.

18. An overhead sensing device according to claim 17, wherein said remote control means is detachable connected to extended cables from said height adjustment means.

19. An overhead sensing device according to claim 17, wherein said non-conductive flexible feeler means is made of an insulating material.

20. An overhead sensing device according to claim 17, wherein said height adjustment means includes a conductive rod and wherein said non-conductive flexible feeler is mounted on the conductive rod.

21. The overhead sensing device according to claim 17, wherein said non-conductive flexible feeler means is attached at its distal end to a conductive telescoping mast.

22. The overhead sensing device according to claim 21, wherein said telescoping mast is operable to receive radio transmissions.

23. A method for setting the height of an overhead obstruction sensing device for a motor vehicle, comprising the steps of:
adjusting a ruler so as to correspond to the height of the motor vehicle;
placing said ruler adjacent the overhead obstruction sensing device; and
remotely controlling the height of said overhead obstruction sensing device from outside the motor vehicle in accordance with the adjustable ruler.

24. An overhead sensing device for motor vehicles, comprising:
a non-conductive sensing means for contacting an overhead obstruction;
actuation means for outputting a signal in response to said non-conductive sensing means contacting an overhead obstruction;
first height adjustment means for adjusting the height position of said non-conductive sensing means from within the motor vehicle;
second height adjustment means for adjusting the height position of the non-conductive sensing means remotely from the motor vehicle;
indication means for indicating a non-alarm state and an alarm state, said indicating means indicates the alarm state in the case where the indication means receives the output signal from the actuation means in response to an obstruction contact; and ruler means for adjustably measuring the height of the motor vehicle, said ruler means being placeable adjacent to the non-conductive sensing means in order to assist in remote adjustment of the height of the non-conductive sensing means to a height which is higher than a highest point of the motor vehicle.

25. An overhead sensing device according to claim 24, wherein the second height adjustment means includes a wireless transmitter and a corresponding wireless receiver.

* * * * *